United States Patent [19]

Inoue et al.

[11] 4,389,432

[45] Jun. 21, 1983

[54] METHOD OF IMPROVING ADHESION AND ADHESION IMPROVERS USED THEREFOR

[75] Inventors: Yoshio Inoue; Hisashi Shimizu, both of Annaka, Japan

[73] Assignee: Shin-Etsu Chemical Co., Ltd., Tokyo, Japan

[21] Appl. No.: 386,230

[22] Filed: Jun. 8, 1982

[30] Foreign Application Priority Data

Jun. 17, 1981 [JP] Japan ................... 56-92352

[51] Int. Cl.$^3$ .......................... B05D 1/36; C08L 31/02
[52] U.S. Cl. ..................... 427/299; 427/322; 427/327; 428/447; 428/448; 523/454; 523/456; 523/435; 525/102; 525/326.5; 525/342
[58] Field of Search ............. 524/188, 506, 547, 359, 524/91; 525/102, 342, 326.5; 428/447, 448; 427/299, 322, 327; 523/454, 456, 435

[56] References Cited

U.S. PATENT DOCUMENTS 4,235,954 11/1980 Humphrey ..................... 428/447
4,243,720 1/1981 Schroeter et al. ............... 428/448
4,353,959 10/1982 Olson et al. .................... 428/448

FOREIGN PATENT DOCUMENTS 850419 10/1960 United Kingdom ............... 428/448

*Primary Examiner*—Lewis T. Jacobs
*Attorney, Agent, or Firm*—Toren, McGeady and Stanger

[57] ABSTRACT

The invention provides a novel means for solving the problem of poor adhesion between the surface of a substrate of a metal or a plastic resin, e.g. polycarbonate resin, and a cured coating film of an organopolysiloxane formed thereon to impart good surface properties, e.g. hardness and weathering resistance, to the substrate surface by use of an adhesion improver as a primer which comprises a copolymer of an organosilicon compound having a hydrolyzable group and an ethylenic unsaturation in the molecule, glycidyl methacrylate and an organic monomer, e.g. methyl methacrylate and vinyl acetate, a reaction product of an aminoalkyl-containing organosilane compound and an acid anhydride and, optionally, an ultra-violet light absorber in a limited proportion.

8 Claims, No Drawings

METHOD OF IMPROVING ADHESION AND ADHESION IMPROVERS USED THEREFOR

BACKGROUND OF THE INVENTION

The present invention relates to a method of improving adhesion and an adhesion improver used therefor. More particularly, the invention has an object to provide a novel means for improving adhesion between the surface of shaped articles of various kinds of plastic or metallic materials as the substrate and the cured surface film of a silicone, i.e. organopolysiloxane composition, formed on the substrate surface to impart excellent wearing resistance and other excellent properties of the silicone to the surface.

As is well known, it is widely practiced in the prior art to provide the surface of a shaped article of a plastic resin or a metal with a cured surface of a silicone to impart excellent surface properties inherent to the silicone material.

One of the problems in such a method of surface coating is that good adhesion cannot always be obtained between the substrate surface and the cured coating film of the silicone with few exceptions of several specific combinations of certain kinds of plastics and the silicones having very limited structures.

It is therefore eagerly desired to develop an efficient adhesion improver or a primer to solve the above described problem of poor adhesion between the substrate surface and the cured coating film of silicones. Various types of such adhesion improvers have been proposed hitherto including, for example, a primer comprising a polyalkylene imine and a trialkoxy silane containing an epoxy group as the main ingredients (see Japanese Patent Publication 54-28429); a primer comprising an epoxy resin and a trialkoxy silane containing an amino or imino group as the main ingredients (see Japanese Patent Publication No. 54-28430); a composition comprising a polyisocyanate and a transesterification product of a polyester or polyether polyol with an alkoxy silane (see Japanese Patent Publication No. 48-41697); a composition mainly composed of methyl methacrylate (see Japanese Patent Publication No. 50-39096 and Japanese Patent Kokai No. 52-138565); a primer composition mainly composed of an epoxyalkyl trialkoxy silane (see Japanese Patent Kokai No. 54-81378); an undercoating composition comprising a specific silane compound and an acid anhydride (see Japanese Patent Kokai No. 54-155229); a composition comprising a cohydrolysis product of at least two kinds of silane compounds and an alkyl-etherified methylol melamine (see Japanese Patent Kokai No. 55-99930); and the like. Unfortunately, none of these prior art primers or adhesion improvers can impart sufficiently high adhesion, resistance against hot water, weathering resistance and the like desired properties to the silicone coating films on the substrate surface.

On the other hand, shaped articles of polycarbonate resins are expected to be widely used in a variety of applications by virtue of the good transparency and excellent impact resistance thereof although they suffer from the problems in connection with the surface properties that they are remarkably susceptible to scratches resulting in decreased transparency and that they are relatively weak against the attack of organic solvents so that application of a polycarbonate resin is limited for such reasons.

Needless to say, various attempts have been made to improve the surface properties of a shaped article of polycarbonate resins without adversely affecting the excellent properties inherently possessed by the polycarbonate resins. The investigations hitherto undertaken for the most promising method are directed to impart the surface of the polycarbonate resin articles with a cured surface coating film of an organopolysiloxane composition having excellent wearing resistance.

A problem in the above approach is that sufficiently good adhesion can not always be obtained between the surface of a polycarbonate resin article and the organopolysiloxane composition capable of forming a coating film having excellent wearing resistance.

Thus, there are known no means for effectively improving the surface properties of a shaped article of a plastic resin or, in particular, polycarbonate resin in respect of adhesion, weathering resistance, resistance against water or, in particular, hot water.

SUMMARY OF THE INVENTION

It is therefore an object of the present invention to provide a novel and improved means for improving the adhesion between the substrate surface of a plastic resin or a metal and a cured surface film of an organopolysiloxane composition freed from the above described problems in the prior art methods and adhesion improvers therefor.

The invention provides a novel adhesion improver which comprises (a) 100 parts by weight of a copolymer formed of
 (a-1) an organosilicon compound having at least one hydrolyzable group bonded directly to the silicon atom and at least one ethylenic double bond in a molecule,
 (a-2) glycidyl methacrylate, and
 (a-3) an organic monomer having an ethylenic unsaturation;

(b) from 1.0 to 40.0 parts by weight of a reaction product formed by the reaction of
 (b-1) an organosilane compound having an aminoalkyl group as represented by the genral formula $$H-NH-CH_2-CH_2)_mNH-CH_2)_nSi(R)_a(X)_{3-a},$$

in which R is a monovalent hydrocarbon group having from 1 to 6 carbon atoms, X is a hydrolyzable group, m is zero, 1 or 2, n is 1, 2 or 3 and a is zero, 1 or 2, and
 (b-2) an acid anhydride having at least three carbon atoms in a molecule; and, optionally, (c) from 0.1 to 30 parts by weight of an ultraviolet light absorber.

The method of the present invention for improving the adhesion between the substrate surface and the cured coating film of an organopolysiloxane composition formed thereon is performed either by treating the substrate surface in advance with the above described adhesion improver prior to coating with the organopolysiloxane composition or by admixing the coating composition with the above described adhesion improver of the invention so that the coating film is formed on the substrate surface in the presence of the above described adhesion improver at the interface therebetween.

DETAILED DESCRIPTION OF THE PREFERRED EMBODIMENTS

As is generally understood, curing of most of the organopolysiloxane-based coating compositions proceeds, after application thereof to the substrate surface, by the formation of siloxane linkages between hydroxy groups or hydrolyzable groups such as alkoxy and acyloxy groups bonded to the silicon atoms so that good adhesive bonding is obtained between the organopolysiloxane composition and the substrate surface when the substrate is made of a glassy or ceramic material but, on the contrary, no good adhesion is obtained on the surface of a substrate made of a plastic resin or a metal.

In view of the unavailability of effective adhesion improvers useful on the surface of a plastic or metallic substrate surface greatly limiting the application of many types of organopolysiloxane-based coating compositions capable of giving a cured coating film having excellent weathering resistance, heat resistance, resistance against water and the like surface properties by themselves on the surface of a plastic or metallic substrate, the inventors have conducted extensive investigation arriving at the establishment of the present invention.

The adhesion improver of the present invention is a composition comprising the above defined components (a), (b) and, optionally, (c) and, when present at the interface between the substrate surface and a coating film of a cured organopolysiloxane coating composition, the coating film is adhesively bonded very firmly to the substrate surface of a plastic or a metal irrespective of the molecular structure of the organopolysiloxane coating composition so that, as a result, the shaped articles of a plastic or a metal can be imparted with excellent surface properties in respect of the weathering resistance, heat resistance, resistance against water and the like.

In the following, detailed descriptions are given of the respective components (a), (b) and (c) comprised in the inventive adhesion improvers.

The component (a) is a ternary copolymer formed of the three kinds of the monomers (a-1), (a-2) and (a-3) defined above. The monomeric component (a-1), which is an organosilicon compound having at least one hydrolyzable group and at least one ethylenic double bond simultaneously in a molecule, is exemplified by vinyl tris(tert-butylperoxy) silane, vinyl triacetoxy silane, vinyl methyl dimethoxy silane, vinyl dimethyl methoxy silane, vinyl methyl diethoxy silane, vinyl trimethoxy silane, vinyl triethoxy silane, vinyl dimethyl ethoxy silane, viny methyl diacetoxy silane, vinyl dimethyl acetoxy silane, 3-methacryloxypropyl dimethyl methyoxy silane, 3-methacryloxypropyl triethoxy silane, 3-methacryloxypropyl trimethoxy silane, 3-methacryloxypropyl trimethoxy silane, 3-methacryloxypropyl methyl dimethoxy silane, 3-methacryloxypropyl dimethylmethoxy silane, 3-methacryloxypropyl methyl diethoxy silane, 3-methacryloxypropyl dimethyl ethoxy silane, 3-acryloxypropyl trimethoxy silane, 3-thiomethacryloxypropyl trimethoxy silane, 3-thiomethacryloxypropyl methyl dimethoxy silane, 3-methacrylamidopropyl triethoxy silane, 3-methacrylamidopropyl methyl dimethoxy silane, vinyl tripropenoxy silane, 3-methacryloxypropyl methyl dipropenoxy silane and the like. These silane compounds are known to be effective as a silane coupling agent.

The monomeric component (a-2) is glycidyl methacrylate which is a well known organic compound and need not be described here.

The monomeric component (a-3) is an organic monomer having an ethylenic double bond exemplified by styrene, methyl methacrylate, vinyl acetate, esters of acrylic acid, vinyl chloride, ethylene, vinylidene chloride and the like.

The component (a) in the inventive adhesion improver is a ternary copolymer obtained by the copolymerizsation of the above described monomeric components (a-1), (a-2) and (a-3). The copolymerizsation of these monomers is carried out usually by the radical polymerization using a free radical polymerization initiator including organic peroxides such as benzoyl peroxide, di-tert-butyl peroxide, dicumyl peroxide and the like and azo compounds such as azsobisisobutyronitrile and the like. These polymerization initiators are used in an amount from about 0.1 to about 5.0% by weight based on the total amount of the monomeric components (a-1), (a-2) and (a-3).

The polymerization velocity of the above mentioned radical polymerization is relatively low at room temperature so that the polymerization reaction is preferably carried out at an elevated temperature of 70° C. or higher or, more preferably, from 80° to 110° C. The polymerization velocity can be controlled, if necessary, by diluting the monomeric components with an organic solvent such as benzene, toluene, 1,4-dioxane, acetone, ethyl acetate, isobutyl acetate, methyl isobutyl ketone, isopropyl alcohol and the like.

The molar ratio of the monomeric components in the polymerization mixture should be such that the amounts of the components (a-1), (a-2) and (a-3) in the mixture are from 0.1 to 20% by moles, from 0.01 to 40% by moles and from 40 to 95% by moles, respectively.

The component (b) in the inventive adhesion improver is a reaction product of an aminoalkyl-containing silane compound represented by the general formula (I) and an acid anhydride. The group denoted by R in the formula (I) above for the silane compound is a monovalent hydrocarbon group having from 1 to 6 carbon atoms exemplified by alkyl groups such as methyl, ethyl, propyl and butyl groups, cycloalkyl groups such as cyclohexyl group, alkenyl groups such as vinyl and allyl groups and aryl groups such as phenyl group as well as substituted groups having halogen atoms in place of part of the hydrogen atoms in the above named hydrocarbon groups. The symbol X in the formula denotes a hydrolyzable group exemplified by alkoxy, acyloxy, ketoxime, aminoxy and aminoxime groups.

The aminoalkyl-containing organosilane compound in conformity with the general formula (I) is exemplified by 3-aminopropyl triethoxy silane, 3-aminopropyl methyl diethoxy silane, N-(2-aminoethyl)-3-aminopropyl trimethoxy silane, N-(2-aminoethyl)-3-aminopropyl methyl dimethoxy silane, N,3-triethylenediamine propyl trimethoxy silane, N,3-triethylenediamine propyl trimethoxy silane and the like in which the hydrolyzable group denoted by X is an alkoxy group.

The acid anhydride (b-2) to be reacted with the above given aminoalkyl alkoxy silanes to give a reaction product as the component (b) in the inventive adhesion improver should have at least three carbon atoms in a molecule and is exemplified by propionic anhydride, methyl tetrahydrophthalic acid anhydride, methyl himic acid anhydride, i.e. methyl nadic acid anhydride, benzophenone tetracarboxylic acid anhydride, ethyleneglycol bis trimellitate, maleic acid anhydride, polyazelaic polyanhydride, trimellitic acid anhydride, nadic acid anhydride, pyromellitic acid anhydride, phenyl maleic acid anhydride, methyl hexahydrophthalic acid anhydride, hexahydrophthalic acid anhydride, dodecyl succinic acid anhydride, dichloromaleic acid anhydride and chlorendic acid anhydride, i.e. hetic acid anhydride as well as the acid anhydride compound sold by Dai Nippon Ink Chemical Co. with a tradename of MCTC and expressed by the structural formula

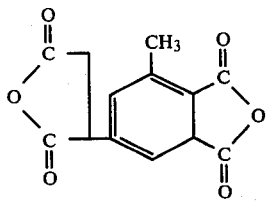

and the silicon-containing acid anhydride compounds expressed by the structural formulas

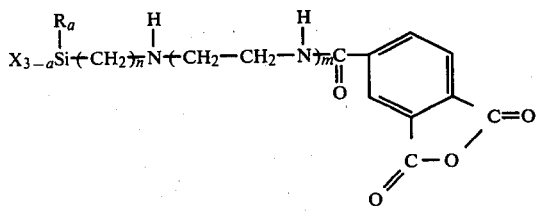

and

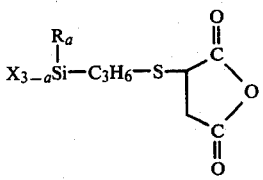

The reaction of the aminoalkyl-containing silane compound and the acid anhydride takes place by merely mixing these reactants at room temperature and proceeds exothermically to give the desired reaction product. It should be noted that gelation sometimes occurs in this reaction mixture so that the reaction is preferably carried out by diluting the reaction mixture with a suitable organic solvent such as methyl alcohol, ethyl alcohol, butyl alcohol, isopropyl alcohol, acetone, methyl ethyl ketone, tetrahydrofuran, dimethyl formamide and the like. The mixing ratio of the aminoalkyl-containing silane and the acid anhydride is usually equimolar although either one of the reactants may be used in an amount slightly in excess over the other.

The amount of this component (b) in the inventive adhesion improver is usually in the range from 1.0 to 40.0 parts by weight or, preferably, from 10.0 to 30.0 parts by weight per 100 parts by weight of the component (a).

A composition composed of the above described components (a) and (b) blended in the specified proportion is of course effective as an adhesion improver. When the organopolysiloxane-coated article is to be used outdoors, however, a problem is sometimes encountered that the organopolysiloxane coating layer loses the improved initial adhesion to the substrate surface in prolonged use, presumably, due to the photodegradation caused by exposure to light. In this connection, the inventors have conducted investigations to solve this problem and arrived at a discovery that formulation of an ultraviolet light absorber in the inventive adhesion improver is very effective.

Suitable ultraviolet light absorbers as the component (c) include benzophenone compounds such as 2,2'-dihydroxy-4-methoxy benzophenone, 2-hydroxy-4-methoxy benzophenone, 2,2'-dihydroxy-4,4'-dimethoxy benzophenone and the like; triazole compounds such as 2-(2'-hydroxy-5-methylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and the like; and salicylic acid derivatives such as phenyl salicylate and the like. Preferred ultraviolet absorbers among the above named compounds are, in particular, 2,2'-dihydroxy-4,4'-dimethoxy benzophenone and 2-(2'-hydroxy-3'-tert-butyl-5'-methylphenyl)-5-chlorobenzotriazole from the standpoint of their good miscibility with the component (a).

The amount of this ultraviolet absorber as the component (c) in the inventive adhesion improver, when added, should be in the range from 0.1 to 30.0% by weight based on the amount of the component (a) when a substantial effect is desired.

The method of the invention for improving adhesion may be performed, as is mentioned before, by using the above described inventive adhesion improver either as a primer which is applied to the substrate surface before coating or as an additive in the organopolysiloxane-based coating composition with which the substrate surface is to be coated.

When the inventive adhesion improver is used as a primer, it is optional that the adhesion improver is diluted with a suitable organic solvent which is exemplified by ketone solvents such as acetone, methyl ethyl ketone and methyl isobutyl ketone, ether solvents such as diethyl ether, dioxane and tetrahydrofuran, alcoholic solvents such as methyl alcohol, ethyl alcohol and propyl alcohol, ester solvents such as ethyl acetate, isobutyl acetate and ethyl propionate, aromatic hydrocarbon solvents such as benzene, toluene and xylene, and halogenated hydrocarbon solvents such as methylene chloride and chloroform.

The adhesion improver of the present invention may further be admixed, according to need, with a so-called silane coupling agent exemplified by vinyl trimethoxy silane, vinyl triethoxy silane, vinyl methyl dimethoxy silane, vinyl methyl diethoxy silane, vinyl dimethyl methoxy silane, vinyl triacetoxy silane, vinyl tris(tert-butylperoxy)silane, 3-glycidyloxypropyl trimethoxy silane, 3-glycidyloxypropyl methyl diethoxy silane, 3-methacryloxypropyl trimethoxy silane, 3-methacryloxypropyl triethoxy silane, 3-methacryloxypropyl methyl dimethoxy silane, 3-methacryloxypropyl methyl diethoxy silane, N-(2-aminoethyl)-3-aminopropyl trimethoxy silane, N-(2-aminoethyl)-3-aminopropyl methyl dimethoxy silane, 3-chloropropyl trimethoxy silane, 3-chloropropyl methyl dimethoxy silane, 3-mercaptopropyl trimethoxy silane, 3-mercaptopropyl methyl dimethoxy silane, 3-aminopropyl triethoxy silane, 3-aminopropyl methyl diethoxy silane, 3-methacrylamidopropyl triethoxy silane, 3-thiomethacrylatopropyl trimethoxy silane, 3-methacrylamidopropyl methyl diethoxy silane and 3-thiomethacrylatopropyl methyl dimethoxy silane as well as the reaction products of 3-glycidyloxypropyl trimethoxy silane and 3- aminopropyl triethoxy silane or 3-glycidyloxypropyl trimethoxy silane and N-(2-aminoethyl)-3-aminopropyl trimethoxy silane and the like.

As is mentioned before, the adhesion improver of the present invention is useful when the surface of a shaped article of a plastic resin or a metal is provided with a cured surface film of an organopolysiloxane-based coating composition firmly bonded thereto. The plastic resins of which the shaped article to be coated with the organopolysiloxane composition is made include epoxy resins, ABS resins, nylons, polystyrene resins, melamine resins, polyester resins, polycarbonate resins and the like and the metals include aluminum, iron, zinc, tin, gold, silver, copper, nickel, stainless steel, chromium and the like. In particular, the inventive adhesion improver is very effective as a primer when the surface of a shaped article of a polycarbonate resin is to be provided with a firmly bonded cured coating film of an organopolysiloxane composition having excellent anti-wearing resistance. The thus obtained shaped article has greatly improved surface properties, in particular, in respect of the weathering resistance, anti-cold resistance, heat resistance, resistance against water and the like.

Following are the examples to illustrate the present invention in further detail for the preparation of the inventive adhesion improvers as well as for the efectiveness of the inventive method by use of the adhesion improvers.

Preparation 1

A copolymer suitable as the component (a) was prepared by adding dropwise a mixture composed of 65 g of methyl methacrylate, 10 g of 3-methacryloxypropyl trimethoxy silane, 14 g of glycidyl methacrylate, 5 g of vinyl acetate, 5 g of ethyl acrylate and 1 g of benzoyl peroxide into a solvent mixture in a flask composed of each 78 g of isobutyl acetate and isopropyl alcohol and heated at 100° C. and heating the mixture with agitation under reflux for 7 hours after the end of the dropwise addition of the monomer mixture followed by the removal of the solvents by distillation under a reduced pressure of 2 mmHg to give 100 g of a polymerization product which was a colorless, transparent gummy material. This product is called the copolymer No. 1.

Further, copolymers No. 2 to No. 17 were prepared each in a similar manner to the above with a monomeric formulation either in conformity with the definition of the component (a) or by the omission of the monomeric component (a-1) or (a-2). The monomeric formulations for these copolymers are summarized in Table 1 below.

Preparation 2

A reaction product suitable as the component (b) in the inventive adhesion improver was prepared by adding dropwise 221 g of 3-aminopropyl triethoxy silane into a solution of 98 g of maleic anhydride in 319 g of ethyl alcohol followed by aging for 2 hours at room temperature to give a reaction product.

Preparation 3

An organopolysiloxane coating composition was prepared Publication No. 52-36800. Thus, into a mixture at room temperature composed of 75 parts by weight of methyl trimethoxy silane, 20 parts by weight of tetraethoxy silane and 5 parts by weight of a dimethyl polysiloxane having an average degree of poly-merization of about 13 and terminated at both molecular chain ends with silanolic hydroxy groups were gradually added dropwise 8 parts by weight of 2% sulfuric acid under agi-tation followed by aging for 8 hours at room temperature to give an organopolysiloxane for coating use.

TABLE 1

| Co-polymer No. | 3-Glyci-dyloxy-propyl trimeth-oxy silane | Glycidyl meth-acrylate | Methyl meth-acrylate | Vinyl acetate | Ethyl acryl-ate | Benzoyl per-oxide |
|---|---|---|---|---|---|---|
| 1 | 10 g | 14 g | 65 g | 5 g | 5 g | 1 g |
| 2 | 7 | 1 | 57 | 3 | 3 | 1 |
| 3 | 7 | 28 | 30 | 3 | 3 | 1 |
| 4 | 1 | 10 | 54 | 3 | 3 | 1 |
| 5 | 21 | 10 | 34 | 3 | 3 | 1 |
| 6 | 8 | 13 | 60 | 4 | 4 | 1 |
| 7 | 5 | 7 | 34 | 2 | 2 | 1 |
| 8 | 8 | 11 | 54 | 3 | 3 | 1 |
| 9 | 7 | 10 | 51 | 3 | — | 1 |
| 10 | 7 | 10 | 51 | — | 3 | 1 |
| 11 | 7 | 10 | 54 | — | — | 1 |
| 12 | 7 | 10 | 48 | 3 | 3 | 1 |
| 13 | 7 | — | 67 | 3 | 3 | 1 |
| 14 | 7 | — | 58 | 3 | 3 | 1 |
| 15 | — | 10 | 55 | 3 | 3 | 1 |
| 16 | 9 | 13 | 60 | 4 | 4 | 1 |
| 17 | 9 | 13 | 58 | 4 | 4 | 1 |

EXAMPLE 1

A solution of the copolymer No. 1 as the component (a) obtained in Preparation 1 above was prepared by dissolving 70 g of the copolymer in 350 g of methyl isobutyl ketone and 100 g of isobutyl acetate and a 100 g portion of the solution was admixed with 4 g of the reaction product obtained in Preparation 2 above containing 2 g of the solid as the component (b) with or without addition of 2-(2'-hydroxy-tert-butyl-5'-methylphenyl)-5-chlorobenzotriazole as the component (c) in an amount indicated in Table 2 below to give an adhesion improver of the invention. The copolymers No. 2 to No. 17 were also used for the preparation of similar adhesion improvers with the formulations as indicated in Table 2. In some of the experiments, the adhesion improver was further admixed with 3-aminopropyl triethoxy silane as the component (d) and 3-glycidyloxypropyl trimethoxy silane as the component (e) in amounts indicated in Table 2.

A polycarbonate resin plate (a product by Mitsubishi Gas Chemical Co.) was coated with the thus prepared solution of adhesion improver by dipping followed by heating at 100° C. for 1 hour and then further coated with the organopolysiloxane prepared in Preparation 3 above followed by heating at 100° C. for 1 hour to give a transparent and hard coating film of 2 μm thickness.

The adhesion of this coating film to the substrate surface of the polycarbonate resin plate as well as weathering resistance thereof were examined by the procedures described below to give the results shown in Table 2.

The adhesion improver used in Comparative Experiment No. 5 was a solution prepared by dissolving the copolymer as the component (a) and the reaction product obtained in Preparation 2 above and 3-aminopropyl triethoxy silane in a proportion indicated in Table 2 in a 1:1 solvent mixture of methyl isobutyl ketone and n-butyl alcohol to give a solid content of 9% by weight. The adhesion improvers used in Experiments Nos. 6 and 7 were each prepared by omitting the copolymer as the component (a).

Examination procedure of adhesion: The cured surface film of the organopolysiloxane on the polycarbonate substrate was cut with a knife in a checkerboard-like manner to form 100 squares each 1 mm by 1 mm wide and then a pressure-sensitive adhesive tape was put thereon followed by peeling the tape off the surface to count the number of the squares of the cured film unremoved from the surface as carried by the tape. The results were expressed by the number of the remaining squares of the 100 squares as formed by cutting.

Examination procedure of weathering resistance: The polycarbonate resin plate coated with the cured organopolysiloxane by use of the adhesion improver was subjected to the accelerated aging in a weathering resistance tester manufactured by Toyo Seiki Saisakusho under repeated cycles each composed of an 8 hours exposure to ultraviolet light of a wavelength of 254 nm at 70° C. in a dry condition and an 4 hours exposure to the same ultraviolet light at 50° C. in a wet condition and the time required to the appearance of cracks in the coating film by the visual examination or the time to the failure of the coating film in the above described checkerboard peeling test with one or more of the 1 mm by 1 mm squares removed by peeling of the tape was recorded.

TABLE 2

| Experiment No. | Copolymer No. | Component (b) | Component (c) | Component (d) | Component (e) | Adhesion | Weathering resistance, hours |
|---|---|---|---|---|---|---|---|
| 1 | 1 | 19 | — | — | — | 100/100 | 100 |
| 2 | 1 | 25 | 12 | — | — | 100/100 | 500 |
| 3 | 2 | 19 | 9 | — | — | 100/100 | 350 |
| 4 | 3 | 19 | 9 | — | — | 100/100 | 550 |
| 5 | 4 | 19 | 9 | — | — | 100/100 | 300 |
| 6 | 5 | 19 | 9 | — | — | 100/100 | 350 |
| 7 | 6 | 1 | 9 | — | — | 100/100 | 200 |
| 8 | 7 | 20 | 9 | — | — | 100/100 | 500 |
| 9 | 8 | 19 | 1 | — | — | 100/100 | 150 |
| 10 | 7 | 19 | 15 | — | — | 100/100 | 550 |
| 11 | 9 | 19 | 9 | — | — | 100/100 | 450 |
| 12 | 10 | 19 | 9 | — | — | 100/100 | 450 |
| 13 | 11 | 19 | 9 | — | — | 100/100 | 450 |
| 14 | 12 | 2 | 9 | 8 | 9 | 100/100 | 300 |
| 15 | 12 | 9 | 9 | 5 | 5 | 100/100 | 450 |
| 16 | 3 | 10 | 9 | 9 | — | 100/100 | 450 |
| 1* | 13 | 19 | — | — | — | 100/100 | 120 |
| 2* | 14 | 19 | 9 | — | — | 100/100 | 150 |
| 3* | 15 | 19 | 9 | — | — | 50/100 | — |
| 4* | 16 | — | 9 | — | 10 | 100/100 | 70 |
| 5* | 17 | — | 1 | — | — | 30/100 | 17 |
| 6* | —** | 98 | — | 2 | — | 100/100 | 70 |
| 7* | —** | 89 | 9 | 2 | — | 100/100 | 90 |

*Comparative Experiment
**Component (a) not used
Component (c): 2-(2'-hydroxy-3-tert-butyl-5'-methylphenyl)-5-chlorobenzotriazole

EXAMPLE 2

Experiments Nos. 17 to 25 were carried out each in substantially the same manner as in Experiment No. 2 of Example 1 above except that the maleic anhydride in Preparation 2 was replaced with the same amount of one of the acid anhydrides shown in Table 3 below to prepare the component (b). The results are shown in the Table. When the acid anhydride was acetic anhydride, the result in the weathering resistance test was only 70 hours.

TABLE 3

| Experiment No. | Acid anhydride | Adhesion | Weathering resistance, hours |
|---|---|---|---|
| 17 | Mehyl tetrahydrophthalic anhydride | 100/100 | 550 |
| 18 | Methyl himic anhydride | 100/100 | 500 |
| 19 | Phthalic anhydride | 100/100 | 400 |
| 20 | Succinic anhydride | 100/100 | 450 |
| 21 | Nadic anhydride | 100/100 | 300 |
| 22 | Phenyl maleic anhydride | 100/100 | 300 |
| 23 | Acid anhydride I[(a)] | 100/100 | 450 |
| 24 | Acid anhydride II[(b)] | 100/100 | 400 |
| 25 | Propionic anhydride | 100/100 | 300 |

[(a)]Acid anhydride I:

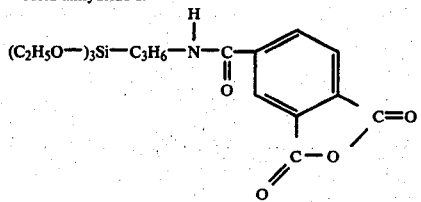

[(b)]Acid anhydride II:

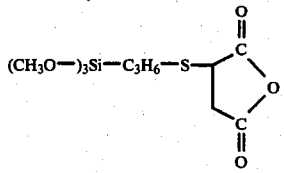

What is claimed is:
1. An adhesion improver which comprises
 (a) 100 parts by weight of a copolymer formed of
  (a-1) an organosilicon compound having at least one hydrolyzable atom or group bonded to the silicon atom and at least one ethylenic double bond in a molecule,
  (a-2) glycidyl methacrylate, and
  (a-3) an organic monomer having an ethylenic unsaturation; and
 (b) from 1.0 to 40.0 parts by weight of a reaction product formed by the reaction of
  (b-1) an organosilane compound having an aminoalkyl group as represented by the general formula

$$H-NH-CH_2-CH_2)_mNH-CH_2)_nSi(R)_a(X)_{3-a},$$

in which R is a monovalent hydrocarbon group having from 1 to 6 carbon atoms, X is a hydrolyzable group, m is zero, 1 or 2, n is 1, 2 or 3 and a is zero, 1 or 2, and
  (b-2) an acid anhydride having at least three carbon atoms in a molecule.

2. The adhesion improver as claimed in claim 1 which further comprises, per 100 parts by weight of the component (a), (c) from 0.1 to 30 parts by weight of an ultraviolet light absorber.

3. The adhesion improver as claimed in claim 1 or claim 2 wherein the organic monomer having an ethylenic unsaturation as the component (a-3) is selected from the class consisting of styrene, methyl methacrylate, vinyl acetate, esters of acrylic acid, vinyl chloride, ethylene and vinylidene chloride.

4. The adhesion improver as claimed in claim 1 or claim 2 wherein the copolymer as the component (a) is a copolymer formed of from 0.1 to 20% by moles of the organosilicon compound as the component (a-1), from 0.01 to 40% by moles of glycidyl methacrylate as the component (a-2) and from 40 to 95% by moles of the organic monomer as the component (a-3).

5. The adhesion improver as claimed in claim 2 wherein the ultraviolet light absorber as the component (c) is 2,2'-dihydroxy-4,4'-dimethoxy benzophenone or 2-(2'-hydroxy-3'-tertbutyl-5'-methylphenyl)-5-chlorobenzotriazole.

6. A method for improving the adhesion between a substrate surface and a cured coating film of an organopolysiloxane formed thereon which comprises forming the cured coating film of the organopolysiloxane in the presence of an adhesion improver as claimed in claim 1 or claim 2 at the interface between the substrate surface and the coating film of the organopolysiloxane.

7. The method as claimed in claim 6 wherein the substrate surface is treated in advance with the adhesion improver to be coated therewith before the coating film of the organopolysiloxane is provided thereon.

8. The method as claimed in claim 6 wherein the adhesion improver is admixed in the organopolysiloxane with which the coating film is formed on the substrate surface so as to be present at the interface between the substrate surface and the coating film of the organopolysiloxane.

* * * * *